Dec. 11, 1934.   G. R. BAKER ET AL   1,984,009

METHOD OF TREATING CHOCOLATE

Filed July 15, 1932

GEORGE RALPH BAKER
GEORGE DONALD WILSON.
INVENTORS

BY *Carl C. Letscher*

ATTORNEY

Patented Dec. 11, 1934

1,984,009

UNITED STATES PATENT OFFICE 1,984,009

METHOD OF TREATING CHOCOLATE

George Ralph Baker and George Donald Wilson, Willesden Junction, London, England, assignors to Baker Perkins Company, Inc., Saginaw, Mich., a corporation of New York Application July 15, 1932, Serial No. 622,673
In Great Britain July 25, 1931

9 Claims. (Cl. 91—68)

This invention relates to a method of coating confectionery and the like with chocolate or similar coating material and pertains more particularly to those steps of the coating process in which the coating material is treated just prior to its application to the goods.

Heretofore in the coating of confectionery it has been customary to temperature treat the chocolate or other coating material to promote graining or partial crystallization in the pumps, conduits or the containers before the coating material was delivered, in the form of a curtain, to the confections. This method of treating confectionery has its disadvantages and the crystals formed in the coating before passing through the curtain forming conduit were not uniformly distributed throughout the mass; consequently the chocolate was of a non-uniform character and lumpy, and it was difficult to properly coat certain types of confections; for example, in coating very large pieces of confectionery it is desirable to have a heavy coating. In order to secure a heavy or thick coating it was necessary to double coat the goods; that is, pass them through the coater a second time after the first coating had set.

In the coating of very soft centers it was generally necessary to use a thick or dense chocolate which would form a heavy coating and prevent the soft centers from melting, when they came in contact with the warm fluid coating, and settle whereby the finished confection would have an irregular non-uniform shape.

It is an object of our present invention to provide a method concerning the conditioning of the chocolate whereby the finished goods are provided with a homogeneous coating of a satisfactory uniform character having an outside gloss or handsome texture; to securing homogeneous consistency so as to avoid flaking or shelling of the coating; to promote solidification to set it when the chocolate is on the goods from the inside as well as the outside of the coating; to promote graining or partial crystallization from the cooling surfaces inwardly of the layer; to provide zones of solid or starter chocolate in a condition adapted to start or promote graining of the layer under treatment and to so treat and condition the coating curtain that it will be of a thickness approximating that of the coating after it has been applied to the goods, thereby lessening the amount of chocolate necessary for rehandling and reconditioning, and conditioning the chocolate so as to lessen the liability of forming feet, fins and tails on the finished goods, particularly when a thick coating is desired.

With these and certain other objects in view which will appear later in the specification, our invention comprises the method described and claimed and the equivalents thereof.

In carrying our invention into effect, we provide by way of example, a conduit through which the coating material passes and which conduit delivers the coating material in the form of a curtain approximating the thickness of the coating upon the goods. In order to properly condition the coating curtain we provide on both sides of the conduit means for temperature treating the chocolate. Such means may consist of coils or pipes through which may be circulated cooling liquids, such as brine, water or cold air or the curtain may be passed between nozzles which deliver to both sides of the curtain a stream of refrigerated air. Instead of passing the chocolate through a conduit it may be flowed over a plate having cooling coils on the under side and a nozzle for delivering a blast of refrigerated or cold air on the top of the curtain. The above means are just a few of the many ways in which the objects of our invention may be carried out.

The temperature of the tempering fluids may be adjusted so that the graining effect may extend into the chocolate stream from both sides toward the center to any predetermined depth, as for example, the stream may be grained on the two outer sides, while the center of the stream may remain ungrained in the form of a sandwich of ungrained chocolate between the two grained layers, or the tempering fluid may be so adjusted that the graining may extend through to the center of the stream, thus forming a solid stream of grained or conditioned chocolate. Likewise for certain types of confections the curtain may be grained stronger on one side than on the other side; for example, it may be desired for certain types of confections to have the side of the curtain adjacent the confection very strongly grained so as to set almost as soon as it is applied to the goods.

One specific use of this type of graining is applicable to very soft centers when it is desired to coat the goods with a fine or soft coating and where under ordinary conditions the soft coating would melt the center and cause it to settle or run out of shape.

With our invention a soft coating material may be applied to soft centers with that side of the curtain next to the center strongly grained so as to set almost as soon as it strikes the goods and before the confection has a chance to settle or become deformed by the fluid coating melting the confection center.

The outer side of the curtain could be less grained and consequently settle upon the goods and leave a smooth finish. Again it may be desired for certain types of confections to have that side of the curtain adjacent the goods to be coated of a weaker grain than the outside of the coating curtain, in order to permit the outside to harden first and the inside to partially dissolve and adhere to the confection.

In some cases it is desirable to have the coating curtain flow over a zone of solid or starter chocolate in order to promote a more rapid graining of the chocolate. This is accomplished by providing grooves or pockets on one or both of the inner walls of the conduit or the surfaces of the plates over which the curtain passes and which will retain a predetermined amount of solid coating material.

Referring now to the drawing, which is intended to show diagrammatically several methods of treating the chocolate, and which is not intended to show a specific means for carrying out the method,—

Figure 1:
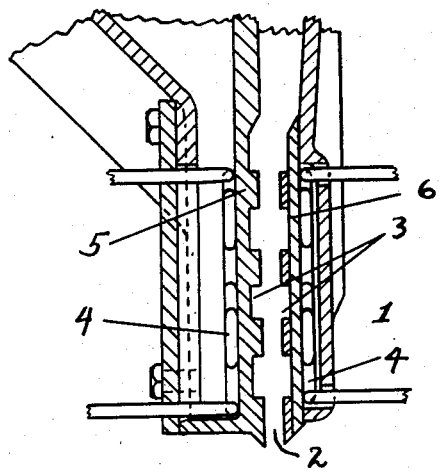
Figure 1 represents a cross section through one form of conduit in which solid or starter chocolate may be used on both sides of the curtain to assist in graining the coating material.

Referring now to Figure 1, the chocolate is passed through a conduit 1, having a passageway 2, approximating the thickness of the curtain after it has been applied to the goods, and having grooves 3, for solid or starter chocolate over which the coating material flows. The starter chocolate assists in permitting granulation or partial granulation of the coating stream. Temperature treating fluid is circulated through the coils 4, adjacent both walls 5 and 6 of the pasageway 2.

Figure 2:
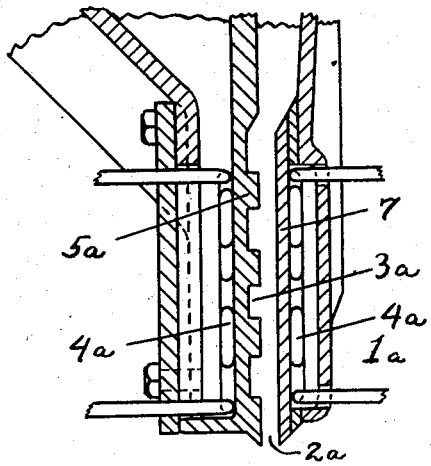
Figure 2 is a modified form of the conduit shown in Figure 1, showing grooves for starter chocolate on one side of the curtain only.

In Figure 2 grooves or pockets 3a for the solid or starter chocolate are provided on only one wall as 5a of the conduit 1a. A smooth graining plate 7, is provided on the other wall as 6a, and tempering fluid is supplied to the coils 4a adjacent both walls of the passageway 2a.

While we have shown the grooves applied to the left hand wall as 5a of the conduit, it is obvious that this wall could be made plain and the grooves carried by the other wall, depending on the nature of the goods to be coated or the conditon of the coating material desired.

Figure 3:
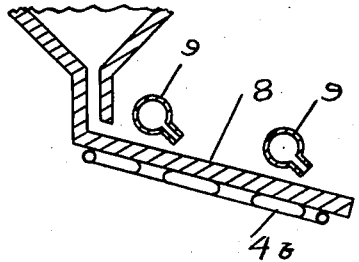
Figure 3 is a further modified form showing diagrammatically a method of conditioning chocolate in which cooling coils may be used on one side of the plate and nozzles for temperature treating the other side of the coating material as it passes over the cooled plate.

Figure 3 shows another method of carrying out our invention in which the coating curtain may be flowed over a horizontal or nearly horizontal plate 8, having temperature treating coils 4b on the under side and air nozzles 9 directing a blast of cold air to the upper side of the coating stream. While this figure shows a plain graining plate over which the curtain flows, it is obvious that grooves or pockets similar to those shown in Figures 1 and 2 could be made in the top side of this plate to retain solid or starter chocolate to assist in the graining of that side of the curtain.

Figure 4:
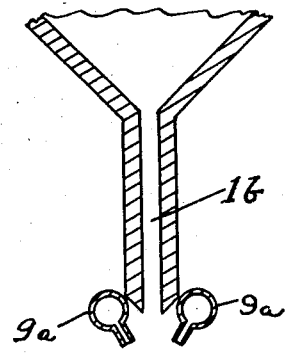
Figure 4 shows a still further modification of a device for temperature treating both sides of the curtain with refrigerated air.

In Figure 4, the coating material is passed through a conduit 1b which forms it into a curtain of a thickness approximating the thickness of the coating upon the goods and is then temperature treated or grained by air nozzles 9a directing a stream of cold air against both sides of the curtain. In this view we have shown but two nozzles located on each side of the coating stream. It is obvious, however, that any number of nozzles may be supplied according to the temperature of the cooling air and the desired strength of graining. The above figures are for illustrative purposes only and show only a few of the many ways in which our invention may be carried out.

By the above described method we are enabled to produce a coating curtain which is adapted to quickly, economically and thoroughly coat all types of confections and which coating will have a uniform consistency, improve cocoa butter retaining qualities, and will keep longer without turning gray or showing spots.

Having thus described our invention, what we claim and desire to secure by Letters Patent is:

1. The method of treating chocolate for employment as a coating for confectionery which comprises delivering the chocolate to the goods to be coated in a curtain approximating the thickness of the coating on the goods, temperature treating the curtain on both sides, while passing it over solid starter chocolate so as to promote graining or partial crystallization of both sides of the coating curtain.

2. The method of treating chocolate for employment as a coating for confectionery which comprises delivering chocolate to the goods to be coated in a curtain approximating the thickness of the coating on the goods, temperature treating the curtain on both sides while passing it over zones of solid starter chocolate so as to promote graining or partial crystallization of both sides of the coating curtain and adjusting said temperature treatment so that the graining of one side of the curtain may be of a different strength from that of the other side.

3. The method of treating chocolate for employment as a coating for confections which comprises delivering the chocolate to the goods to be coated in a curtain approximating the thickness of the coating on the goods and temperature treating the curtain on both sides so as to promote graining or partial crystallization of both sides of the coating curtain.

4. The method of treating chocolate for employment as a coating for confections which comprises delivering the chocolate to the goods to be coated in a curtain approximating the thickness of the coating on the goods, temperature treating the curtain on both sides while passing it over zones of solid starter chocolate so as to promote graining or partial crystallization of both sides of the coating curtain and adjusting the temperature treatment so that the outer surface of the coating curtain may have a different strength of graining from the center of the curtain.

5. The method of treating chocolate for employment as a coating for confections which comprises delivering the chocolate to the goods to be coated in a curtain approximating the thickness of the coating on the goods, temperature treating the curtain on both sides so as to promote graining or partial crystallization of both sides of the coating curtain and adjusting the said temperature treatment so as to promote a graining strength on the outside of the curtain different from that in the center of the curtain.

6. The method of treating chocolate for employment as a coating for confectionery, which comprises delivering the chocolate to the goods to be coated in a curtain, temperature treating the curtain on both sides while passing it over solid starter chocolate so as to promote graining or partial crystallization of both sides of the coating curtain.

7. The method of treating chocolate for employment as a coating for confections, which comprises delivering the chocolate to the goods to be coated in a curtain, temperature treating the curtain on both sides so as to promote graining or partial crystallization on both sides of the coating curtain.

8. The method of treating chocolate for employment as a coating for confections, which comprises delivering the chocolate to the goods to be coated in a curtain, temperature treating the curtain on both sides so as to promote graining or partial crystallization on both sides of the coating curtain, and adjusting the said temperature treatment so as to promote a graining strength on one side of the curtain different from that of the other side of the curtain.

9. The method of treating chocolate for employment as a coating stream or curtain for coating confectionery, cooling or lowering the temperature at both sides of a band or layer of chocolate for forming the curtain to produce granulation or partial crystallization from the cooled surfaces inwards of the curtain.

GEORGE RALPH BAKER.
GEORGE DONALD WILSON.